(12) United States Patent
Fu et al.

(10) Patent No.: US 7,313,450 B1
(45) Date of Patent: Dec. 25, 2007

(54) AUTOMATIC METHODS AND SYSTEMS FOR MANUFACTURING RECIPE FEEDBACK CONTROL

(75) Inventors: Ming-Rong Fu, Taoyuan Hsien (TW); Hsin-Chien Tsai, Yunlin County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 11/423,984

(22) Filed: Jun. 14, 2006

(51) Int. Cl.
*G05B 13/00* (2006.01)
(52) U.S. Cl. .................................................. 700/31
(58) Field of Classification Search ............ 700/28–31, 700/97, 108–110, 117–121, 173, 174
See application file for complete search history.

(56) References Cited

U.S. PATENT DOCUMENTS

| | | | |
|---|---|---|---|
| 5,495,417 A * | 2/1996 | Fuduka et al. .............. 700/121 |
| 6,197,604 B1 * | 3/2001 | Miller et al. .................. 438/14 |
| 6,789,067 B1 * | 9/2004 | Liebenow ..................... 705/15 |
| 7,127,304 B1 * | 10/2006 | Gould et al. .................. 700/20 |
| 2002/0095278 A1 * | 7/2002 | Riley et al. ..................... 703/2 |
| 2003/0229410 A1 * | 12/2003 | Smith et al. ................ 700/109 |
| 2005/0132306 A1 * | 6/2005 | Smith et al. ................... 716/1 |
| 2006/0036345 A1 * | 2/2006 | Cao et al. .................... 700/108 |
| 2006/0184264 A1 * | 8/2006 | Willis et al. ................ 700/108 |
| 2006/0235559 A1 * | 10/2006 | Chiou ......................... 700/109 |
| 2006/0265098 A1 * | 11/2006 | Gould et al. ................ 700/121 |

* cited by examiner

*Primary Examiner*—M. N. Von Buhr
(74) *Attorney, Agent, or Firm*—Thomas, Kayden, Horstemeyer & Risley

(57) ABSTRACT

Automatic methods and systems for manufacturing recipes feedback control. Relationships among manufacturing recipes are determined. Wafers are processed based on the manufacturing recipes. The wafers are measured by metrology tools after processing. Feedback information for the manufacturing recipes is acquired from the metrology tool. The manufacturing recipes are automatically modified according to the feedback information and the determined relationships.

14 Claims, 5 Drawing Sheets

AUTOMATIC METHODS AND SYSTEMS FOR MANUFACTURING RECIPE FEEDBACK CONTROL

BACKGROUND

The present invention relates to wafer manufacturing methods, and in particular to computer-implemented automatic methods and systems for manufacturing recipes feedback control.

In integrated circuit (IC) related manufacturing foundries, such as semiconductor product foundries, manufacturing recipes are applied to manufacturing tools for IC product manufacture. FIG. 1 is a diagram of a conventional method of manufacturing recipe feedback control. Manufacturing recipes 100 are generally stored in a manufacturing execution system (MES) database connected to manufacturing tools. When a wafer or wafer lot arrives at a manufacturing tool 102, the manufacturing tool 102 verifies the wafer or wafer lot. A proper or prearranged manufacturing recipe is selected from the MES database. The arriving wafer or wafer lot is then processed by the manufacturing tool 102 according to the manufacturing recipe. After manufacturing, the wafer or wafer lot is transferred to a metrology tool 104 to measure manufacturing result, such as a film deposition thickness, and to acquire feedback information. The manufacturing recipes 100 are then modified manually by operators 106 based on the feedback information.

Such manual modification of manufacturing recipes is time-consuming and error-prone. Additionally, relationships among manufacturing recipes are complex, including one-to-one, one-to-multiple, and multiple-to-one correlation types. FIG. 2 is a diagram illustrating conventional relationships among manufacturing recipes. Manufacturing Recipe-A 200 is a process related to a multi-layered operation, comprising manufacturing Recipe-B 202 and Recipe-C 204, thus the relationship is a one-to-multiple type. Manufacturing Recipe-B 202, Recipe-C 204, and Recipe-D 206 form manufacturing Recipe-E 208, thus the relationship is a multiple-to-one type. Similarly, manufacturing Recipe-C 204 and Recipe-D 206 form manufacturing Recipe-F 210. Therefore, manufacturing Recipe-E 208 is a common recipe for manufacturing Recipe-B 202, Recipe-C 204, and Recipe-D 206 and manufacturing Recipe-F 210 is a common recipe for manufacturing Recipe-C 204 and Recipe-D 206.

Here, manufacturing Recipe-G 212 does not actually exist, but may be formed by manipulations of other recipes. For example, manufacturing Recipe-G 212 is a resulting recipe 214 of Recipe-A 200 less the process of Recipe-C 204. Thus, manufacturing Recipe-G 212 is a virtual recipe.

Manual modification of common or virtual recipes is difficult. For example, if manufacturing Recipe-B 202 has been changed, manufacturing Recipe-E 208 must be changed accordingly. For virtual manufacturing recipes, manufacturing Recipe-G 212 cannot be recognized by operators but need to be modified for manufacturing. As relationships among recipes become more complicated, modification becomes increasingly difficult. Thus, automatic methods and systems for manufacturing recipe feedback control are desirable.

SUMMARY

An embodiment of the invention provides automatic methods for manufacturing recipe feedback control. Relationships between manufacturing recipes are determined. The manufacturing recipes are used in wafer manufacture. After processing, the wafers are transferred to metrology tools and measured thereby to acquire feedback information for the manufacturing recipes. The manufacturing recipes are automatically modified according to the feedback information and the determined relationships.

BRIEF DESCRIPTION OF THE DRAWINGS

The present invention can be more fully understood by reading the subsequent detailed description and examples with references made to the accompanying drawings, wherein.

DESCRIPTION

Figure 3:
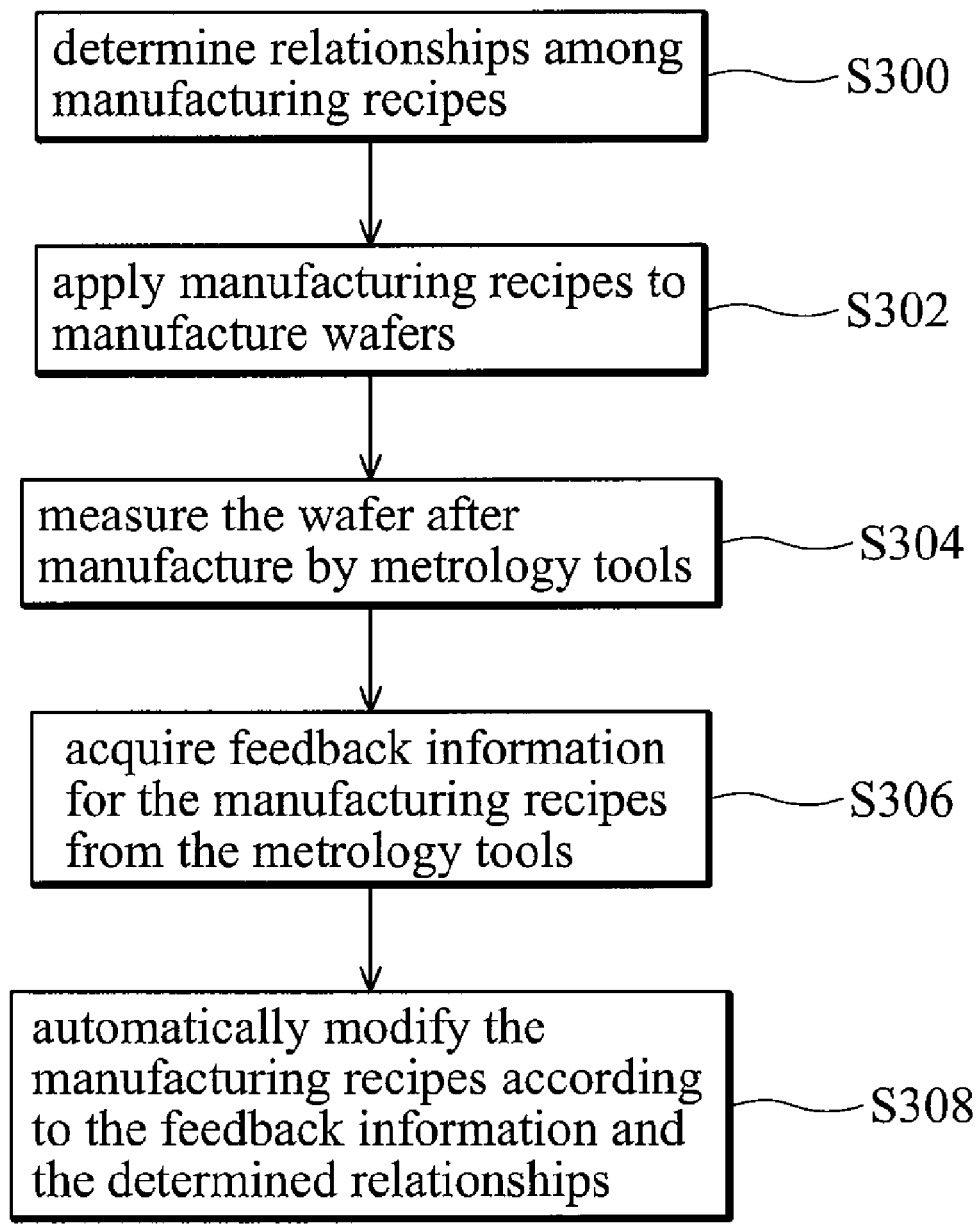
FIG. 3 is a flowchart of an exemplary embodiment of a computer-implemented method for automated manufacturing recipe feedback control.

FIG. 3 is a flowchart of an exemplary embodiment of a computer-implemented method for automated manufacturing recipe feedback control. Relationships among manufacturing recipes are first determined (step S300). Relationships may be a one-to-one, one-to-multiple, or multiple-to-one type corresponding correlations. Relationship determination can also identify common and virtual manufacturing recipes.

The manufacturing recipes are then applied to manufacture wafers (step S302), which may comprise a film deposition process. The wafers are measured by metrology tools after being manufactured (step S304). Here, with the wafer manufacturing a film deposition process, the metrology tools measure film thickness to verify the manufacturing results. Feedback information for the manufacturing recipes is then acquired from the metrology tools (step S306). The manufacturing recipes are modified automatically according to the feedback information of the verification results and the determined relationships (step S308). Thereafter, wafers can be processed according to the modified manufacturing recipes. The relationships and recipes, original or modified, can be stored in a MES database.

Figure 4:
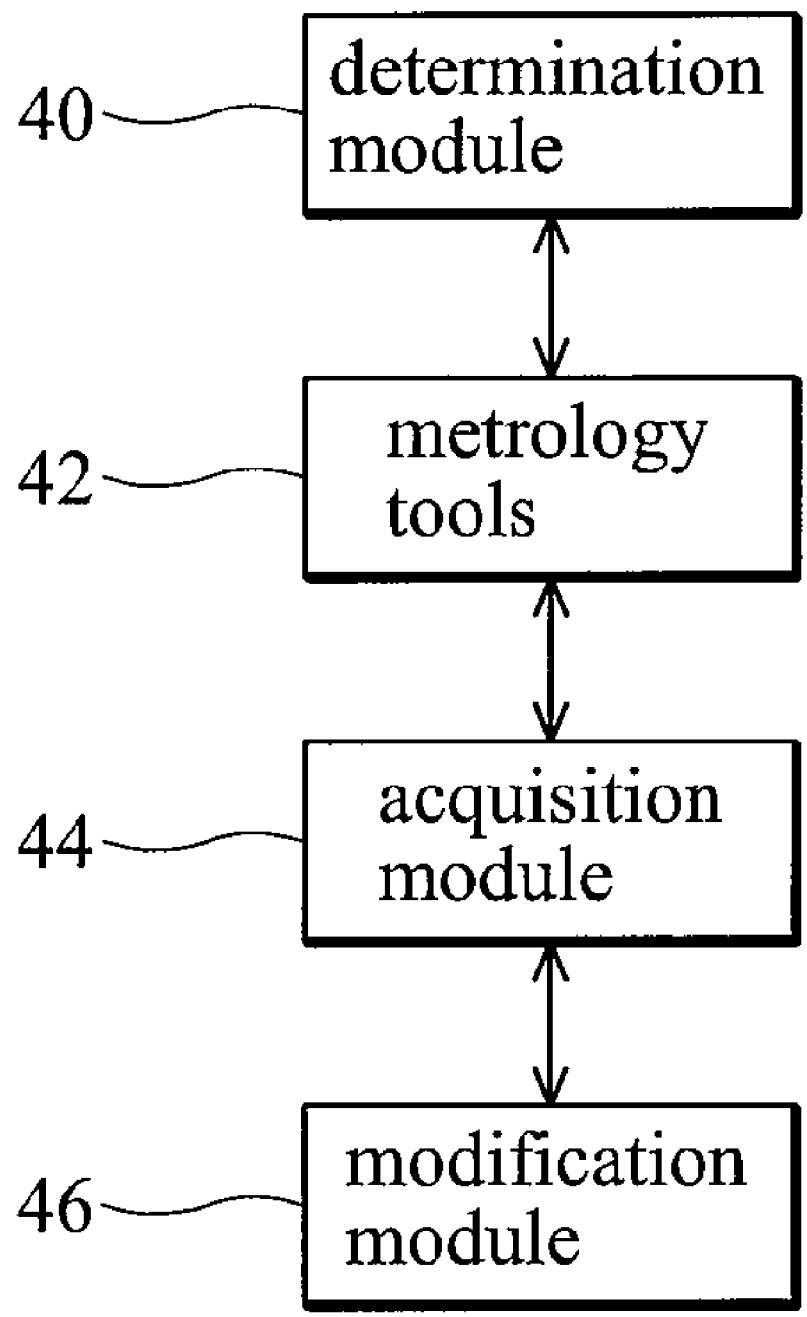
FIG. 4 is a diagram of an exemplary embodiment of a system for automated manufacturing recipe feedback control.

FIG. 4 is a diagram of an exemplary embodiment of a system for automated manufacturing recipe feedback control, comprising a determination module 40, metrology tools 42, an acquisition module 44, and a modification module 46.

The determination module 40 determines relationships between manufacturing recipes. The manufacturing recipes are provided to process wafers, such as in a film deposition process. Metrology tools 42 measure the wafers after processing with the manufacturing recipes. If the manufacturing is a film deposition process, the measurement can be film thickness.

The acquisition module 44, coupled to the metrology tools, acquires feedback information of the manufacturing results of the manufacturing recipes from the metrology tools. The modification module 46 automatically modifies the manufacturing recipes according to the feedback information and the relationship.

Here, again, relationships include one-to-one, one-to-multiple, or multiple-to-one types. Relationship determination also identifies common and virtual manufacturing recipes.

Figure 5:
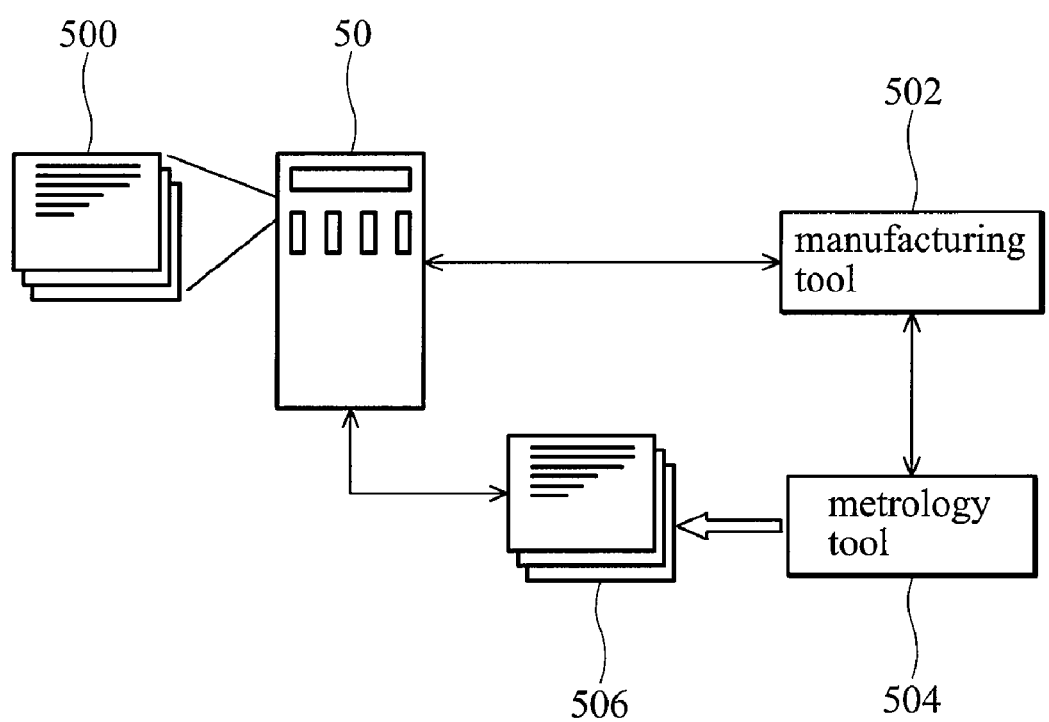
FIG. 5 is a diagram of an exemplary implementation of a system for automated manufacturing recipe feedback control.

FIG. 5 is a diagram of an exemplary implementation of a system for automated manufacturing recipe feedback control. Manufacturing recipes 500 are stored in a MES database 50 connected to a manufacturing tool 502. When a wafer lot arrives at the manufacturing tool 502, the manufacturing tool 502 verifies the wafer lot and selects a corresponding manufacturing recipe from the MES database 50. The wafer lot is then processed according to the selected manufacturing recipe in the manufacturing tool 502. After manufacture, the wafer lot is transferred to a metrology tool 504 for result measurement, such as film deposition thickness. Feedback information 506 is acquired. The manufacturing recipes 500 are then modified automatically based on the feedback information 506.

Figure 1:
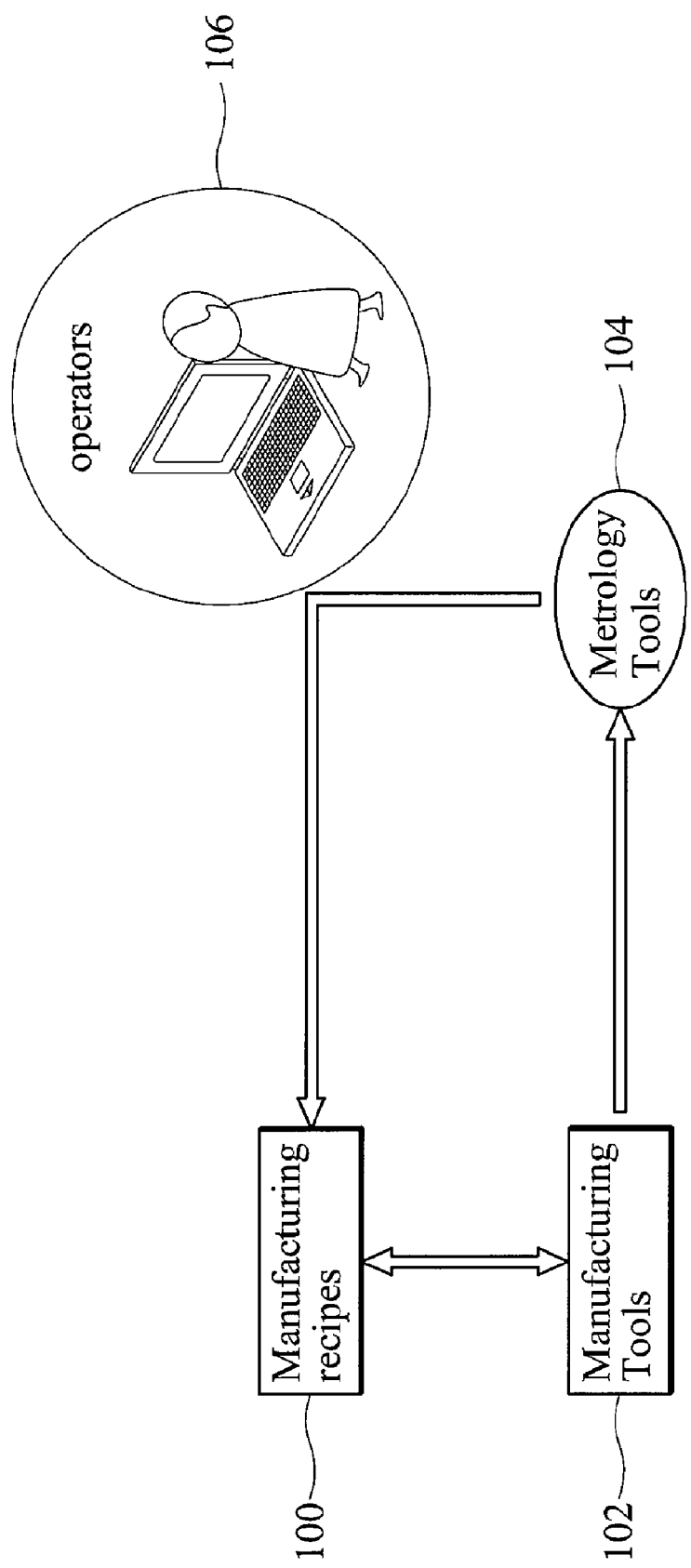
FIG. 1 is a diagram of a conventional method of manufacturing recipe feedback control.
Figure 2:
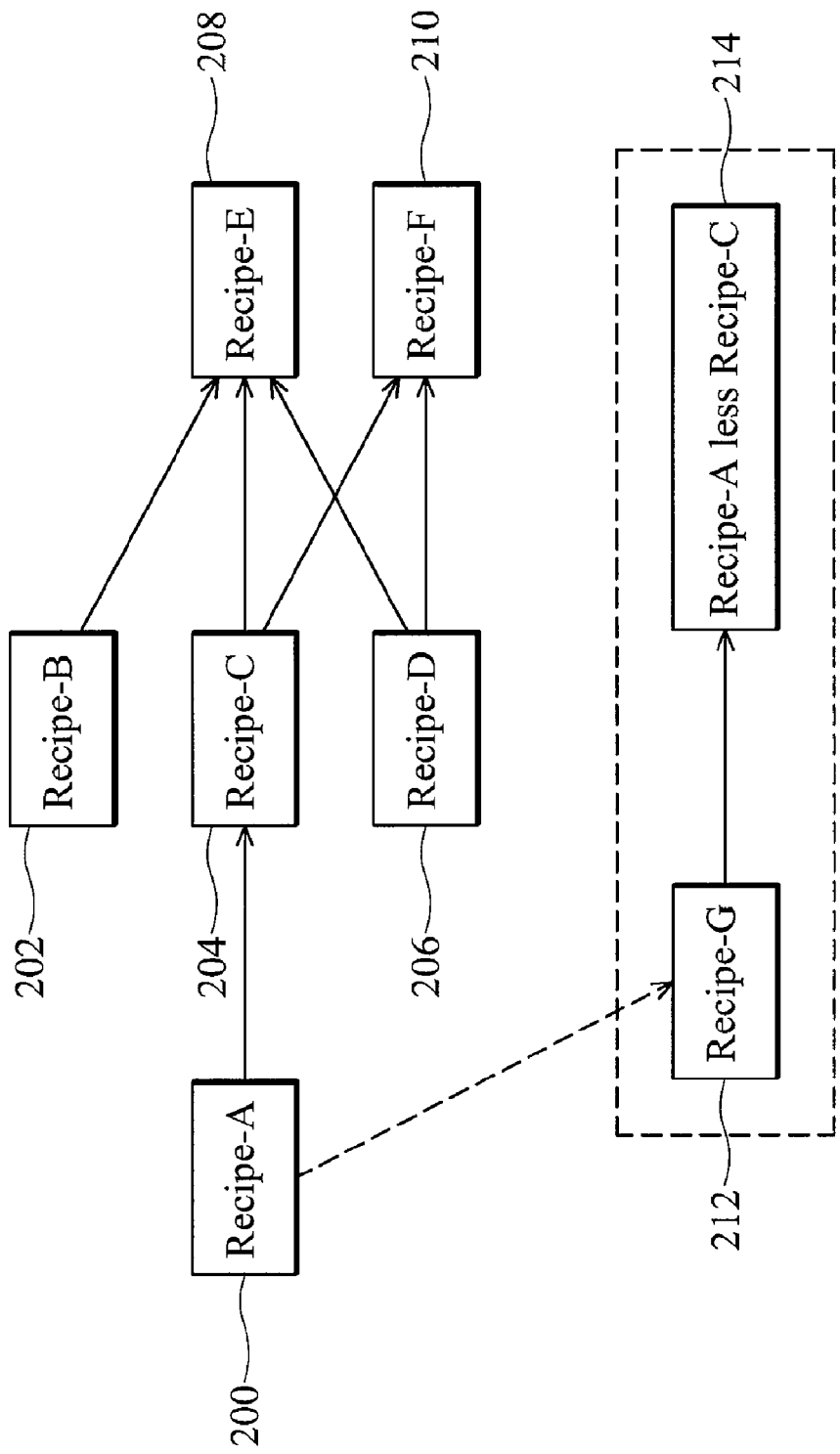
FIG. 2 is a diagram illustrating conventional relationships among manufacturing recipes.

Comparing FIG. 1 with FIG. 5, manufacturing recipe modification is automatically executed after wafer manufacturing and measurement as shown in FIG. 5 by applying the inventive methods, thereby decreasing errors and conserving resources.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A computer-implemented automatic method for manufacturing recipe feedback control, comprising:
    determining relationships among different manufacturing recipes of a manufacturing tool;
    processing of at least one wafer based on the manufacturing recipes;
    acquiring manufacturing results information of the manufacturing recipes; and
    automatically modifying one of the manufacturing recipes according to the information, and modifying the other manufacturing recipes according to the relationships among the different manufacturing recipes.

2. The computer-implemented automatic method for manufacturing recipe feedback control of claim 1, wherein the relationships comprise one-to-one, one-to-multiple, or multiple-to-one corresponding correlation.

3. The computer-implemented automatic method for manufacturing recipe feedback control of claim 1, wherein the determination further comprises common recipe determination.

4. The computer-implemented automatic method for manufacturing recipe feedback control of claim 1, wherein the determination further comprises virtual recipe determination.

5. The computer-implemented automatic method for manufacturing recipe feedback control of claim 1, further processing wafers according to the modified manufacturing recipes.

6. The computer-implemented automatic method for manufacturing recipe feedback control of claim 1, wherein the relationships and the recipes are stored in a database.

7. The computer-implemented automatic method for manufacturing recipe feedback control of claim 1, wherein the wafer manufacture comprises a film deposition process.

8. An automatic system for manufacturing recipe feedback control, comprising:
    a determination module, determining relationships among different manufacturing recipes of a manufacturing tool, wherein the manufacturing recipes are provided to manufacture at least one wafer;
    at least one tool for examining the wafer after processing;
    an acquisition module, coupled to the tool, acquiring manufacturing results information for the manufacturing recipes from the tool; and
    a modification module, automatically modifying one of the manufacturing recipes according to the information, and modifying the other manufacturing recipes according to the relationships among the different manufacturing recipes.

9. The automatic system for manufacturing recipe feedback control of claim 8, wherein the relationships comprise one-to-one, one-to-multiple, or multiple-to-one corresponding correlation.

10. The automatic system for manufacturing recipe feedback control of claim 8, wherein the determination module further executes common recipe determination.

11. The automatic system for manufacturing recipe feedback control of claim 8, wherein the determination module further executes virtual recipe determination.

12. The automatic system for manufacturing recipe feedback control of claim 8, further comprising at least one manufacturing tool, processing wafers according to the modified manufacturing recipes.

13. The automatic system for manufacturing recipe feedback control of claim 8, wherein the relationships and the recipes are stored in a database.

14. The automatic system for manufacturing recipe feedback control of claim 8, wherein in the determination module, wafer processing comprises a film deposition process.

* * * * *